(12) United States Patent
Pool et al.

(10) Patent No.: US 7,173,229 B2
(45) Date of Patent: Feb. 6, 2007

(54) SOLID STATE IMAGER

(75) Inventors: Peter James Pool, Maldon Essex (GB); Raymond Thomas Bell, Stanmore (GB)

(73) Assignee: E2V Technologies (UK) Limited, Chelmsford (GB)

( * ) Notice: Subject to any disclaimer, the term of this patent is extended or adjusted under 35 U.S.C. 154(b) by 0 days.

(21) Appl. No.: 10/529,876

(22) PCT Filed: Oct. 3, 2003

(86) PCT No.: PCT/GB03/04277

§ 371 (c)(1),
(2), (4) Date: Nov. 4, 2005

(87) PCT Pub. No.: WO2004/032489

PCT Pub. Date: Apr. 15, 2004

(65) Prior Publication Data

US 2006/0108504 A1    May 25, 2006

(30) Foreign Application Priority Data

Oct. 4, 2002 (GB) .................................. 0222990.4

(51) Int. Cl.
*H04N 3/14* (2006.01)
*H04N 3/335* (2006.01)
*H01L 27/00* (2006.01)
(52) U.S. Cl. .................. 250/208.1; 348/313; 348/320; 348/311
(58) Field of Classification Search ..................... None
See application file for complete search history.

(56) References Cited

U.S. PATENT DOCUMENTS

| 4,649,554 A | 3/1987 | Boudewijns et al. |
| 4,737,841 A | 4/1988 | Kinoshita et al. |
| 4,866,496 A | 9/1989 | Audier |
| 5,051,832 A | 9/1991 | Losee et al. |
| 5,710,447 A | 1/1998 | Tohyama |
| 5,715,001 A | 2/1998 | Matsunaga et al. |

FOREIGN PATENT DOCUMENTS

| EP | 0 473 966 A | 3/1992 |
| EP | 0 593 922 A1 | 4/1994 |

OTHER PUBLICATIONS

JP 7 023294 A, vol. 1995, No. 04, Jan. 24, 1995, Patent Abstract of Japan.

*Primary Examiner*—Georgia Epps
*Assistant Examiner*—Brian Livedalen
(74) *Attorney, Agent, or Firm*—Venable LLP; Robert Kinberg

(57) ABSTRACT

A charge division arrangement for a CCD device for producing a divided charge output from an input charge, comprising an input for receiving an input charge, an array of elements and an output. The array of elements being arranged in rows and columns and having clock connections to allow charge in each row to be successively clocked from one row of elements to the next. At least some of the elements being arranged in a charge division unit having a first element and a second element in adjacent columns and being communicable at least temporarily so that charged introduced into the first element is divided between the first element and the second element, the charge division unit being arranged to produce divided charge for production at the output. The arrangement allows a small amount of charge to be introduced into a CCD circuit.

8 Claims, 2 Drawing Sheets

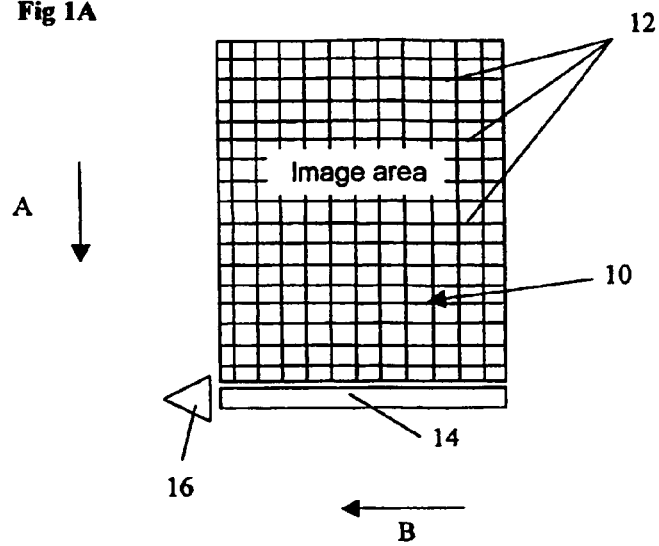
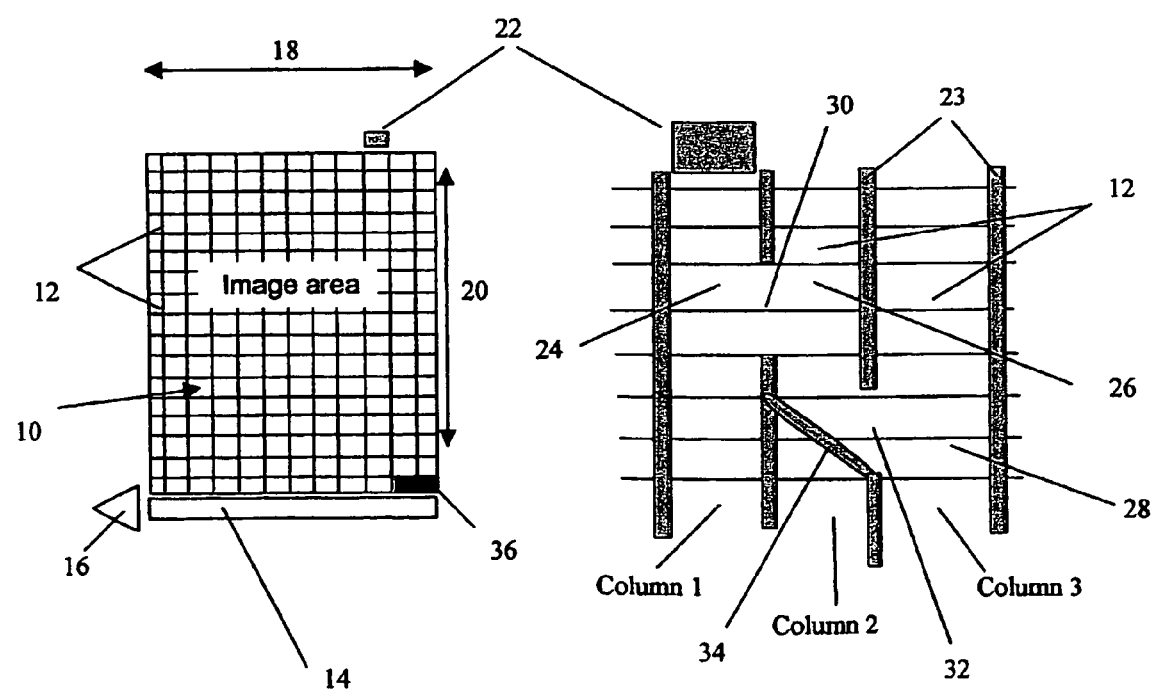

SOLID STATE IMAGER

FIELD OF THE INVENTION

The present invention relates to a solid-state imager, in particular to a charge-coupled device (CCD).

BACKGROUND OF THE INVENTION

In a particular charge coupled device (CCD) imager, signal charge representative of incident radiation is accumulated in any array of pixels over an image area. Following an integration period, signal charge is transferred to an output register by applying appropriate clocking pulses to control electrodes. The signal charge is then read out from the output register and applied to a charge detection circuit to produce a voltage. The voltage is representative of the signal charge and hence the intensity of incident radiation.

A known CCD arrangement is shown schematically in FIG. 1A and comprises an image area 10 constituted by an array of pixels 12 arranged to receive incident radiation from an image scene. The incident radiation liberates electrons within the semiconductor structure of the CCD, the number of electrons liberated being related to the level of radiation incident on that pixel. After a defined integration period, the charge accumulated in each pixel is sequentially moved by application of clocking pulses to the pixel away from one row to the next as shown by the arrow A. The rows are successively clocked into a serial register 14 which itself is clocked in the direction indicated by arrow B. In this way, charge is clocked from each pixel, down through the pixel array and to an output circuit 16 by the serial register 14.

SUMMARY OF THE INVENTION

We have appreciated the need for introduction of a known level of charge into a CCD circuit for various purposes, such as for calibration of the output circuit, for example, or as a mechanism to avoid the effects of electron capture as a result of proton or neutron damage. We have further appreciated, however, that it is difficult to controllably inject appropriate amounts of charges less than around 10,000 electrons.

The invention is defined in the claims to which reference is now directed with preferred features set out in the dependent claims.

The invention may be embodied in two ways. In the first way, some elements within a CCD imager have isolation regions or barriers between columns that are selectably removable. This allows charge introduced into a first row of the imager to be clocked to successive rows and for charge to be divided between one column and another as it progresses through the rows. This allows a defined divided charge to be presented at an output of the device for input to an output circuit.

Alternatively a permanently enabled splitting structure may be incorporated in additional columns at the side of the array which are shielded from incident illumination. In the second embodiment, a charge division structure as described is provided in addition to, and at an input of, the CCD imager. This allows a defined divided charge to be input to the imager.

In either embodiment, a small charge may be injected into a final output register. One application of this is to introduce a "fat zero" which is a small charge level in each of the pixels of a register used to fill vacancies preventing such vacancies affecting an output signal.

BRIEF DESCRIPTION OF THE FIGURES

Embodiments of the invention will now be described by way of example only and with reference to the figures in which:

FIG. 1A: is a schematic diagram of a known CCD imager comprising an array of elements in rows and columns;

FIG. 1: is a schematic diagram of a CCD imager according to a first embodiment;

DESCRIPTION OF PREFERRED EMBODIMENTS

Figure 2:
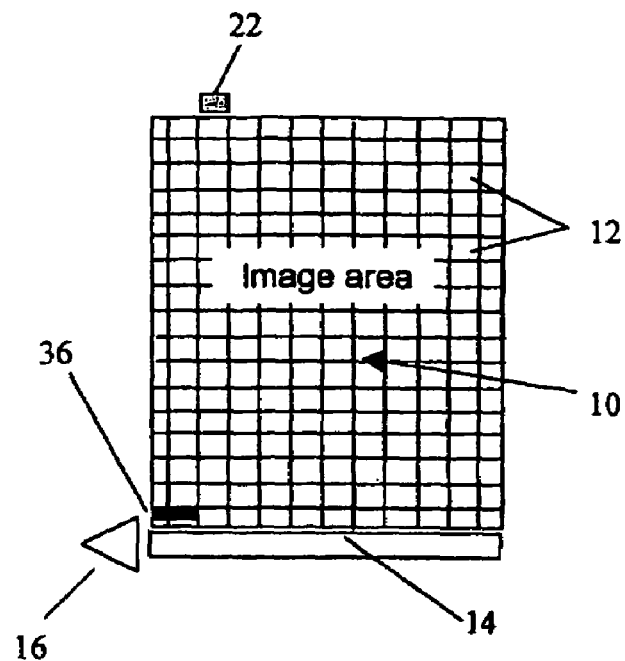
FIG. 2: is a schematic diagram showing how the CCD imager of FIG. 1 may be used.

A first embodiment of the invention is shown in FIG. 1 with a portion of the imager device shown in expanded form in the right-hand side of the figure. The imager CCD device comprises an array of elements 12 comprising an image area 10 arranged in columns 18 and rows 20. Each element of the CCD represents a separate pixel in the final image and comprises clocked CCD cells in a known manner. The elements are connected to a clock arrangement (not shown) so that charge accumulated during an image acquisition integration period in one row can be clocked from one row to another and finally to an output register 14 to be serially shifted out to an output circuit 16.

As previously discussed, there can be a requirement to provide a specific amount of charge to the serial register 14 at the end of the register remote from the output circuit 16 for purposes such as calibration. Known techniques involve injecting charge directly into the serial register. In the present embodiment, however, charge is injected into a first row of the CCD imager image area 10 denoted as position 22. The charge injected at position 22 is sequentially transferred from one row to another down through the image area 10 to the serial register 14. We have appreciated that use can be made of the clocking of charge from one row to another to provide for division of that charge and thereby to allow small defined elements of charge to be injected from the image area 10 to the serial register 14. Transfer and division can occur automatically as part of a normal signal readout sequence or in a special non-image acquisition mode. The arrangement for charge division is shown on the right-hand side of the FIG. 1.

Three columns of the array 10 are shown in greater detail on the right-hand side of FIG. 1 showing an array of elements 12 with column isolation barriers 23 between them. The configuration of adjacent rows and columns as shown comprises a charge division unit, which is configured so that charge introduced at the injection position 22 can be divided in the sense that a portion of the charge diverted elsewhere. Such division is preferably integer division, but could equally be non-integer division depending upon the relative areas of charge storage in columns 1 and 2 defined within the structure. The division unit comprises a first element 24 in a first column adjacent a second element 26 in a second column. Ordinarily, a column isolation barrier 23 would be present between the elements 24 and 26. However, when operating according to the invention, the barrier between the first element 24 and second element 26 is removed, shown as position 30, which allows charge to flow from position 24 to 26. In the event that the barrier is removed at position 30, the charge at positions 24 and 26 will be equal and half the original charge injected at position 22. This will provide division by two of the charge amount.

As clock pulses are applied to the rows, the charge is successively clocked down from each column so that typically half the charge originally injected proceeds down column 1, whilst the remainder of the charge is clocked down column 2. A further portion of the isolation barrier 22 is also selectively removed at position 32 and an additional barrier at position 34 introduced so that the excess charge from position 26 is clocked down column 3 from where it may be discarded if not required. The barriers at positions 30 and 32 may be omitted and re-established in synergy with the clock pulses clocking charge from one row to another so that charge clocked down from column 1 is divided in proportion to the storage areas of elements (pixels) in the two adjacent columns 1 and 2. Column 2 includes the controllable isolation region 34, which causes charge to be passed to column 3.

The charge division unit shown in FIG. 1 can be repeated several times down the height of the image area, producing a charge division each time. The charge division unit is repeated in corresponding positions so that controllable (removable or replaceable) isolation barriers such as shown at position 30 are repeated down the length of the isolation columns 22 between column 1 and 2 and the controllable gate type arrangement of the removable isolation barrier 32 and barrier 34 are repeated between column 2 and column 3. In this way, charge in column 1 is repeatedly divided or shared between an element in column 1 and an element in column 2 reducing the charge clocked down the rows of column 1 each time. The excess charge is repeatedly passed to column 3 where it can be lost by transfer to a dump diode 36.

In the simple case shown of having a removable barrier between two columns, the simplest case is division of charge by two. By providing a plurality of such division units within the image area structure, significant charge division can be obtained (by repeatedly dividing the charge by two at each unit). Although the example of a removable barrier between two columns is shown, it may be possible to extend the concept to have removable barriers between more columns to increase the charge division at each charge division unit. For example, removable barriers between three columns would allow charge to be divided by three when charge is clocked to the relevant position and the isolation columns removed at that position. Other removable barrier arrangements are possible and will depend upon the clock speed at which charges clocked from one row to another. The use of the selectable barrier at positions 32 and 34 is preferred to allow excess charge to be removed from column 2. If this barrier were not present within each division unit, charge at position 26 would simply be clocked down column 2 such that it would remain adjacent the charge at position 24 when clocked from one row to another. As a result, charge would not then flow from column 1 to column 2—the charge being equal in both.

In the embodiment in FIG. 1, the charge is injected at a column, three columns from the end of the structure and, in particular, three columns from the dump diode 36. As a result, charge is injected to the register at a position three columns from the right-hand end, being the end removed from the output circuit 20. The excess charge from column 3 is passed out through the diode 36.

An alternative embodiment is shown in FIG. 2 using the same arrangement of division units of elements within the image area, but having a charge injection position 22 near the left-hand end of the series of columns, namely at a column near the output end of the serial register 14 adjacent to the output circuit 16. In this arrangement, charge is injected into a first column and is successively divided by removing portions of the charge so that a divided small amount of charge is presented to the output circuit 16 without transferring through the serial register 14. The excess charge is diverted away via diode 36 arranged to take charge from the third column assuming that the charge division unit is a mirror image of that shown in FIG. 1.

Figure 3:
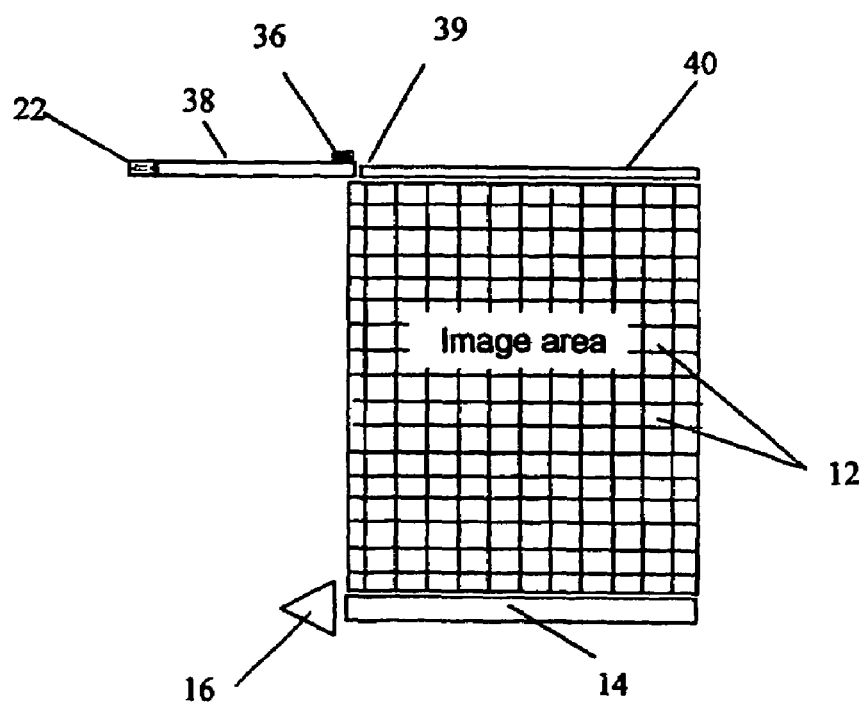
FIG. 3: is a schematic diagram of a second embodiment of the invention.

A second embodiment of the invention is shown in FIG. 3. This arrangement also provides a charge division arrangement or structure, but here is separated from the elements 12 of a main image area 10 and comprises a separate structure 38. The separate charge division structure 38 has a charge injection structure shown as position 22 as previously described and one or more charge division units comprising adjacent columns with charges clocked from the input position 22 along the charge division structure 38 to an input point 39 of an additional distribution register 40 for provision to the image area elements 12. Thus, the rows within the charge division structure are from top to bottom, in the schematic diagram of FIG. 3, and the columns are from left to right. Although a single column is shown in charge structure 38 for ease of representation, this division structure comprises the three-column arrangement, as shown in FIG. 1. A diode 36 is provided at the third column of the charge division structure, as previously described, to remove excess charge.

The distribution register 40 allows charge to be transferred from the division structure to the main image array 10. The injection structure at position 22 can be operated to fill all elements of the distribution register 40, or pulsed to allow a pattern of charge to be loaded which would then transfer injected charge into selected columns of the main array 10. Using the charge distribution register allows charge to be injected so that, when transferred down through the rows of the image area 10, it appears at the end of the serial register distant from the output circuit in a similar manner to that shown in FIG. 1, or to be injected into the image area 10 so as to appear at the output circuit 20 without the requirement to be clocked through the serial register 14. Of course, charge could also be injected at any position between these two.

In common with the embodiments of either FIG. 1, 2 or 3 is that various elements within an array of elements or cells are arranged so that, as charge is clocked from one row to another, charge can be divided from one column to another by use of either permanently removed or selectively removable isolation regions between columns. In the case of such arrangement of elements described as division units within the main image area 10, the regions between columns which control the division of charge needs to be selectively removable (or controllable generally in height) so that the barrier regions are in place when the array is in a normal image acquisition mode. Otherwise, there would be a blurring of charge and hence a blurring of the resultant image. In a charge injection mode in which charge is to be divided through the array, the barriers are reduced or removed. In the embodiment of FIG. 3, or where the division structure is incorporated in additional columns at the side of the image array, the barrier regions may also be selectively removable, but of course could also be permanently fixed as present or absent (or a position between depending upon the division ratio) as the charge division structure does not also need to function as an image acquisition area.

An application of the invention is to inject a small amount of charge to mitigate neutron or proton damage.

One of the effects of proton (or neutron) irradiation of silicon is to eject a silicon atom from its position in the lattice into an interstitial position, leaving a vacancy. Vacancies are mobile, so wander about until they can find a more stable state. In a CCD, the region in the silicon in which charge is transferred (buried channel) is doped with phosphorous and phosphorous forms a stable complex with a vacancy. This complex, known as an e-centre, has an energy state in the middle of the silicon band gap and so is capable of "trapping" an electron. While the electron sits at this energy it is also fixed in space. The effect of having e-centres in the buried channel of a CCD is seen particularly when transferring small numbers of electrons, when a significant proportion can be held by traps, to be released later, after the rest of the charge signal has moved on.

If all pixels contain a small charge level ("fat zero"), in addition to the signal, many of the traps will be continuously filled, allowing the signal charge to be transferred without loss. Often the "fat zero" needs to be very small, to minimise excess shot noise, so the structure shown in FIG. 3 would allow the whole device to be filled from a single low-level injection structure, giving optimum uniformity.

As previously noted, various alternatives of numbers and widths of adjacent columns with variable barriers there between are possible or using the general concept of charge division by sharing charge between cells or elements of adjacent columns in an array and such variations are within the scope of the invention which is defined in the following claims.

The invention claimed is:

1. A charge division arrangement for a CCD device for producing a divided charge output from an input charge, comprising an input for receiving an input charge, an array of elements and an output, the array of elements being arranged in rows and columns and having clock connections to allow charge in each row to be successively clocked from one row of elements to the next, at least some of the elements being arranged in a charge division unit having a first element and a second element in adjacent columns and being communicable at least temporarily so that charge introduced into the first element is divided between the first element and the second element, the charge division unit being arranged to produce divided charge for production at the output.

2. A charge division arrangement according to claim 1, comprising a plurality of charge division units, the output of one charge division unit being arranged to provide charge to the first element of a subsequent charge division unit.

3. A charge division arrangement according to claim 1, wherein the or each charge division unit comprises three elements, the first element and second element in adjacent columns and being communicable at least temporarily, a third element in a column adjacent to the second element and arranged to receive charge from the second element.

4. A charge division arrangement according to claim 3, further comprising a plurality of charge division units, the output of one charge division unit being arranged to provide charge to the first element of a subsequent charge division unit, wherein the first element of each charge division unit is arranged to receive charge from the first element of a previous charge division unit.

5. A charge division arrangement according to claim 1, wherein the first element and second element in the or each unit are separated by a controllable barrier which can be controlled to permit or deny charge flow from the first to the second element.

6. A charge division arrangement according to claim 3, wherein the third and second element in the or each unit are separated by a Switchable barrier which can be controlled to channel charge from the second element to the third element.

7. A charge division arrangement according to claim 1, wherein the charge division arrangement comprises a structure separate from the CCD device.

8. A CCD imager device for producing a signal from an image, comprising a plurality of elements in any array of rows and columns and arranged to operate in an image mode or a charge division mode, in the image mode elements in adjacent columns being separated by barriers, in the charge division mode at least some elements in adjacent columns being communicable such that charge in one element is divided between that element and an element in an adjacent column, whereby charge introduced into one element is divided.

* * * * *